United States Patent [19]

Smith

[11] Patent Number: 5,792,989

[45] Date of Patent: Aug. 11, 1998

[54] WRAP TYPE CABLE CLOSURE END SEAL

[75] Inventor: Russell P. Smith, Georgetown, Tex.

[73] Assignee: Minnesota Mining and Manufacturing Company, St. Paul, Minn.

[21] Appl. No.: 747,132

[22] Filed: Nov. 12, 1996

[51] Int. Cl.[6] .................................................. H02G 15/04
[52] U.S. Cl. .......................... 174/77 R; 174/82; 174/88 R; 174/92; 174/93
[58] Field of Search ................................ 174/77 R, 93, 174/74 R, 82, 94 R, 71 R, 92, 84 C, 88 R, 138 F; 219/535; 439/877; 156/49, 53, 55

[56] References Cited

U.S. PATENT DOCUMENTS

| | | | |
|---|---|---|---|
| 2,647,072 | 7/1953 | Smith | 156/215 |
| 2,906,810 | 9/1959 | D'Ascoli | 174/87 |
| 3,467,761 | 9/1969 | Plummer | 174/36 |
| 3,781,459 | 12/1973 | Peek | 174/94 R |
| 3,941,641 | 3/1976 | Heller, Jr. et al. | 156/272.4 |
| 4,002,818 | 1/1977 | Kunze | 174/77 R X |
| 4,095,044 | 6/1978 | Horsma et al. | 174/138 F |
| 4,358,634 | 11/1982 | Dienes | 174/92 X |
| 4,365,144 | 12/1982 | Reich et al. | 219/535 |
| 4,409,430 | 10/1983 | Boscher et al. | 174/92 |
| 4,436,987 | 3/1984 | Thalmann et al. | 219/535 |
| 4,436,988 | 3/1984 | Blumenkranz | 219/535 X |
| 4,590,328 | 5/1986 | Kunze | 174/77 R X |
| 4,622,436 | 11/1986 | Kinnan | 174/77 R |
| 4,647,716 | 3/1987 | Akiyama et al. | 174/77 R |
| 4,693,767 | 9/1987 | Grzanna et al. | 156/49 |
| 4,732,628 | 3/1988 | Dienes | 174/116 X |
| 4,864,725 | 9/1989 | Debbaut | 174/93 X |
| 4,880,676 | 11/1989 | Puigcerver et al. | 174/77 R X |
| 4,902,855 | 2/1990 | Smith | 174/77 R |
| 4,920,236 | 4/1990 | Makiyo et al. | 174/77 R |
| 4,962,286 | 10/1990 | Jensen et al. | 174/92 |
| 4,963,698 | 10/1990 | Chang et al. | 174/77 R |
| 5,100,494 | 3/1992 | Schmidt | 219/535 X |
| 5,245,151 | 9/1993 | Chamberlain et al. | 174/92 X |
| 5,258,578 | 11/1993 | Smith et al. | 174/93 |
| 5,440,074 | 8/1995 | Meltsch et al. | 174/93 X |
| 5,481,091 | 1/1996 | Grimm et al. | 156/274.2 X |

FOREIGN PATENT DOCUMENTS

| | | | |
|---|---|---|---|
| 1168267 | 12/1956 | France | |
| 2508733 | 12/1982 | France | 174/77 R X |
| 2627026 | 8/1989 | France | H02G 15/013 |
| 1114564 | 10/1961 | Germany | H02G 23/08 |
| 1909322 | 9/1970 | Germany | H02G 23/07 |
| 1943886 | 3/1971 | Germany | H02G 23/07 |
| 2239 136 | 6/1991 | United Kingdom | |
| Wo 86/06316 | 11/1986 | WIPO | |
| WO 90/05401 | 5/1990 | WIPO | |
| WO 90/06010 | 5/1990 | WIPO | H02G 15/013 |
| WO 93/10960 | 6/1993 | WIPO | B29C 65/14 |
| WO 93/16516 | 8/1993 | WIPO | H02G 15/013 |
| WO 96/31091 | 10/1996 | WIPO | H05B 6/64 |

*Primary Examiner*—Dean A. Reichard
*Attorney, Agent, or Firm*—Gerald F. Chernivec; John C. McFarren

[57] ABSTRACT

An end seal for splice closures or for terminals including a body having a core portion and an extended tail portion of a flexible resilient material. The core portion has an outer periphery and openings extending through the core. The openings communicate with the outer periphery. A tail portion is integral with and extends from the core periphery to be wrapped about the core and the cables to be placed in the openings. A sealant strip extends around the cables and between the abutting peripheral surface of the core and the wrapped tail portion. The strip is responsive to electrical or electromagnetic stimulation for heating the sealant strip and causing the strip to bond with adjacent contact surfaces of the cable and the body.

18 Claims, 4 Drawing Sheets

WRAP TYPE CABLE CLOSURE END SEAL

BACKGROUND OF THE INVENTION

This invention relates generally to a cable-closure end seal and more particularly to a wrap type end seal for use in sealing the area at the end of a closure, or terminal, through which cables are positioned, and sealing the area about the cables to restrict moisture or other contamination from entering the closure.

There are various methods for joining or splicing telecommunication cable ends together. In so doing, there are many important considerations such as the use of compatible materials, how many cables are being spliced, is the spliced cable to be buried in soil, immersed in water or suspended in the air, what heat source is required to make the joint, i.e. flammable gasses, will the splice need to be reopened and remade without interruption of working circuits, will the joint have sufficient mechanical strength and is the cost feasible?

Communication cables are typically constructed of a conductor bundle, surrounded by a metal strength and interference sheathing and an outer protective coating, typically of polyethylene. When such cables are spliced and rejoined, the strength and integrity of the rejoined cable is critical. An enclosure or a closure body is used to sealingly surround the splice.

One persistent problem in the use of splice closures involves the need for a complete seal about the splice or closure body. Many prior art splice closures accomplish sealing by providing a complex array of nuts and bolts, clamps, gaskets and heat shrink tubing, as well as potting gels and resins, in various combinations. Besides the fact that these closure methods require significant assembly time, the closures still often suffer leaks or ruptures, particularly along their seals. This problem is even more acute at the sealing of the closure to the cable jacket, where even the slightest defect can result in the migration of moisture along the jacket or the inner surface of the closure. A lack of a complete (hermetic) seal can also be particularly detrimental for pressurized closures.

Although these seals may be strengthened by the use of adhesives, the adhesive bonds formed are normally weak due to the low surface energy of the material of the closure and cables, typically polyethylene. An alternative technique for sealing thermoplastic polymers such as polyethylene is that of fusion bonding. This technique generally involves the heating of the material until it becomes molten at its sealing surfaces, causing it to flow together at the interfaces, and can be used for butt welds, coupling joints and repair sleeves. Two specific methods of fusion bonding: (i) direct heating, and (ii) induction heating, may also be used to activate thermoset and thermoplastic (hot-melt) adhesives, as well as thermoelastic (heat-shrink) tubing.

In direct heating (also known as resistance heating), heat is applied to the thermoplastic article to be bonded by directly attaching heating elements to the article. Current flowing through the elements heats them. The current is supplied by a power source directly connected to the elements, but the heating is not always efficient. One advantage of such a system is that it does not involve emission of radiation, but there are disadvantages such as non-uniform heating of the material.

End seals can be used with hot melts as an alternative bonding material. Hot melt is placed between the resistance wires and the wires are heated to form a bond between the cables and the end seal surfaces. Hot melt bonding can be used with different end seal materials such as foams, elastomers and thermoplastics, but the bond strength is weaker than the fusion bond seal.

The prior art related to end seals for splice closures or terminations is replete with systems for fitting a variety of closure ends. One of these seals comprises a core portion of a flexible, resilient, self-adhesive material. The core portion has an outer periphery and openings extending therethrough. The openings communicate with the outer periphery. An elongated, flexible tail portion is integral with and extends from the core periphery to be wrapped about the core portion and the cables placed in the openings. However, this material may not be suitable for some applications.

Unfortunately, a suitable solution to the problems associated with ease of installation, seal integrity and strength has not been satisfactorily addressed by the prior art. Therefore, what is needed is an end seal for use in sealing the area at the end of a closure, or terminal, through which cables are positioned, and sealing the area about the cables to restrict moisture or other contamination from entering the closure. It is also highly desirable to provide a device which is easy to install and is capable of maintaining seal integrity and strength and can accommodate various numbers of cables and cable sizes.

SUMMARY OF THE INVENTION

The present invention, accordingly, provides an apparatus for sealing the ends of cable closure bodies used to sealingly cover and protect cable splices to restrict moisture or other contamination from entering the closure. To this end, a cable end seal comprises a body including a core portion connected to an extended tail portion. The core portion has an outer peripheral surface and spaced ends. The peripheral surface includes a plurality of cylindrical openings through the core portion extending between the ends. An edge of each opening communicates with the outer peripheral surface of the core portion to define an entrance slot to each opening. The tail portion is flexible and has opposed ends. A first one of the ends is integral with and extends tangentially from the outer peripheral portion of the core. The tail has sufficient length to wrap about the peripheral surface of the core in abutment therewith to cover the entrance slot of each opening and a cable to be placed therein. A second free end of the tail is tapered to a reduced thickness. Means are provided to extend adjacent the abutment between the tail and core portions and along an annular surface of each cylindrical opening, the means being responsive to electrical stimulation for heating adjacent material for bonding of each cable and the body into a sealed unit.

A principal advantage of the present invention is that a one piece end seal can capture a plurality of cables extending through ports in the end seal. An electrical stimulus can be used to heat and bond abutting cable and seal member surfaces together in a sealed unit. This can be enhanced by utilizing a continuous sealant strip having conductors embedded therein to heat and seal the cables in the ports and to seal the engaged surfaces of the body portions when they are joined together.

DESCRIPTION OF THE PREFERRED EMBODIMENT

Figure 1:
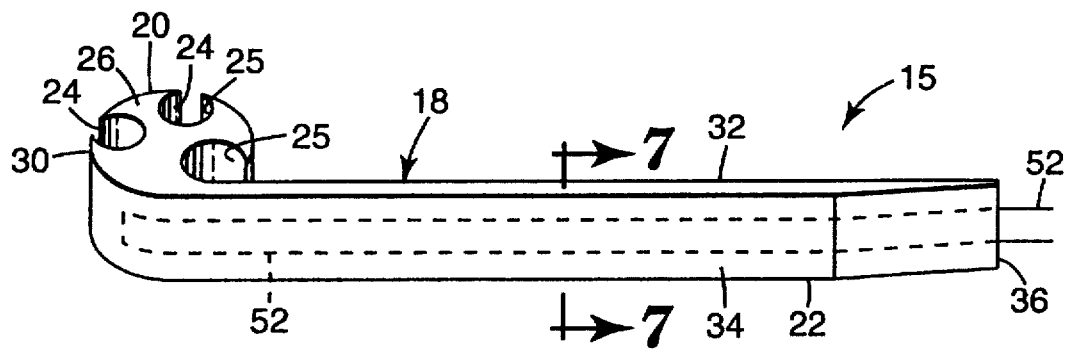
FIG. 1 is a perspective view illustrating an embodiment of the end seal according to present invention.

Referring to FIG. 1, illustrated is an isometric view of an end seal generally designated 15 formed of a polyolefin elastomer material and comprising a body 18 including a core portion 20 and a tail portion 22. The core portion 20 is formed of a circular shape and has a plurality of openings 24 defined by arcuate walls 25 which extend between a pair of opposed ends 26, only one of such ends 26 being shown in FIG. 1. The walls 25 begin and end at an outer peripheral surface 30 of the core portion 20 to form slot-like openings communicating with the openings 24 to permit the core portion 20 to receive endless cables or wires. An inner surface 32 of the tail portion 22 extends from one of the openings 24 generally tangential to the wall 25 and from a position at the slotted opening. The tail portion 22 has a generally uniform thickness and cross section along its length until near a free end 36 where its thickness begins to diminish or taper to a free edge to form a smooth transition to an outer surface 34 of itself after it is wrapped about the peripheral surface 30 of the core portion 20 and the exposed portion, if any, of a wire or cable disposed in each of the openings 24.

Figure 2:
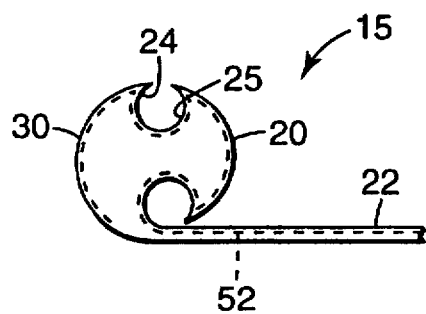
FIG. 2 is an end view illustrating another embodiment according to the present invention with the tail portion partially broken away for illustration.
Figure 3:
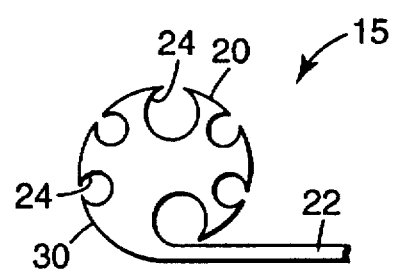
FIG. 3 is an end view illustrating a further embodiment according to the present invention with the tail portion partially broken away for illustration.
Figure 4:
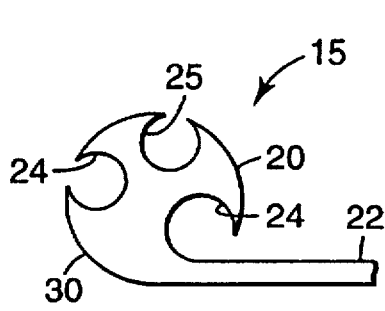
FIG. 4 is an end view illustrating a still further embodiment according to the present invention with the tail portion broken away for illustration.
Figure 5:
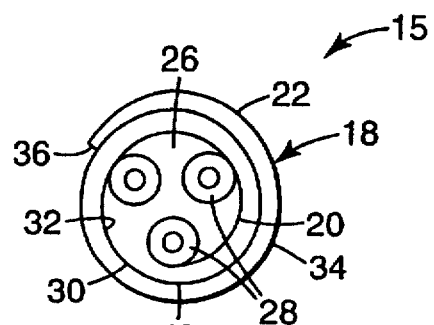
FIG. 5 is an end view illustrating the end seal of FIG. 4 with the tail portion wrapped about the core portion and a cable extending through each cable port.

FIG. 2 illustrates an end seal 15 according to the present invention wherein the core portion 20 is formed with a pair of openings 24. FIG. 3 illustrates an end seal 15 where the core portion 20 has openings 24 of different diameters positioned about the outer peripheral surface 30. FIG. 4, illustrates a core portion 20 with a plurality of openings 24 which are not symmetrical. The tail portion 22 can also have a variety of configurations. It is important however that the tail portion 22 have a length sufficient to wrap about the outer peripheral surface 30 of the core portion 20 at least once, approximately 360° about the center. The tail portion 22 can have any given length greater than the circumference of the outer periphery of the core portion 20, however. FIG. 5 illustrates the tail portion 22 wrapped about a core portion 20 with the tail portion 22 making more than one wrap about the core portion 20, and three cables 28 disposed in the end seal 15.

Figure 6:
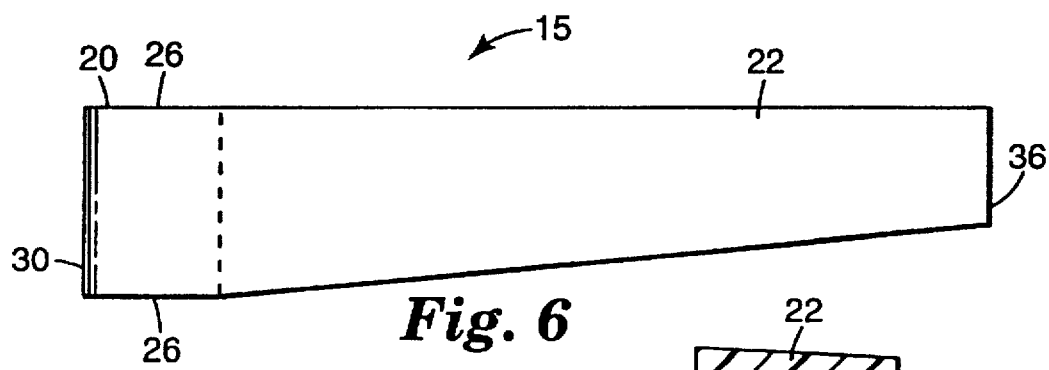
FIG. 6 is a bottom view illustrating an embodiment of the end seal according to the present invention.
Figure 7:
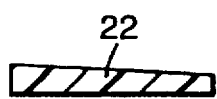
FIG. 7 is a cross-sectional view taken along line 7—7 of FIG. 1, illustrating an embodiment of the tail profile according to the present invention.

FIG. 6 illustrates that the tail portion 22 can also taper in the lengthwise direction to change the width of the tail portion such that it becomes narrower near the free end 36. FIG. 7 illustrates that the tail portion 22, whether of uniform width or of decreasing width, can also taper in the transverse direction to cause the interior end of the seal to have a different outside diameter than at the outer end, resulting in a tapered or cone shaped end seal. In this embodiment, the opposite edges of the tail portion 22 have different thicknesses along the length of the tail portion. Further, the thickness or dimension of the edges may decrease toward the free end. The tail portion is adapted to make a plurality of wraps about the core portion.

Figure 8:
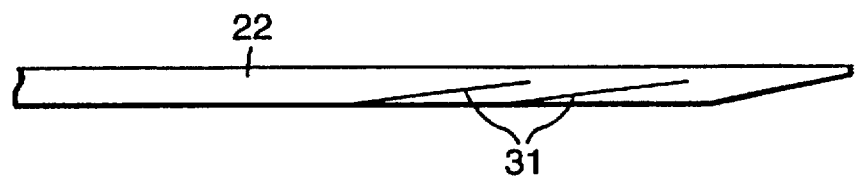
FIG. 8 is a partial view illustrating an embodiment of the tail section according to present invention.
Figure 9:
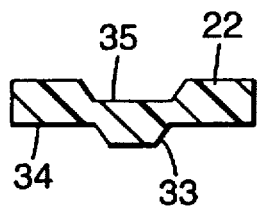
FIG. 9 is a cross-sectional view illustrating another embodiment of the tail profile according to the present invention.

FIG. 8 illustrates a tail portion 22 which is provided with preformed slits 31 which permit the tail portion 22 to be easily torn to a different length by separating the end portion beyond a slit 31. As illustrated in the transverse sectional view in FIG. 9, the tail portion 22 can also be formed with mating ridges or ribs 33 and grooves 35, formed in opposite surfaces of the tail portion 22. In this embodiment the ridge 33 is of trapezoidal shape and extends along the outer surface 34 of the tail portion when it is wrapped and on subsequent wraps, the groove 35 covers the ridge 33 to increase the path along the seal between the wraps and the frictional coefficient such that the axial force along the axis of the end seal is greater and the wraps of the tail portion 22 cannot slide or telescope in relationship to each other.

Figure 11:
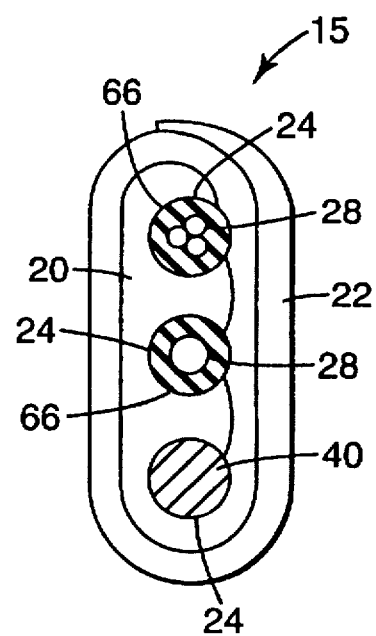
FIG. 11 is an end view illustrating the end seal of FIG. 10 with the tail portion wrapped about the core portion and cables extending through two cable ports.
Figure 10:
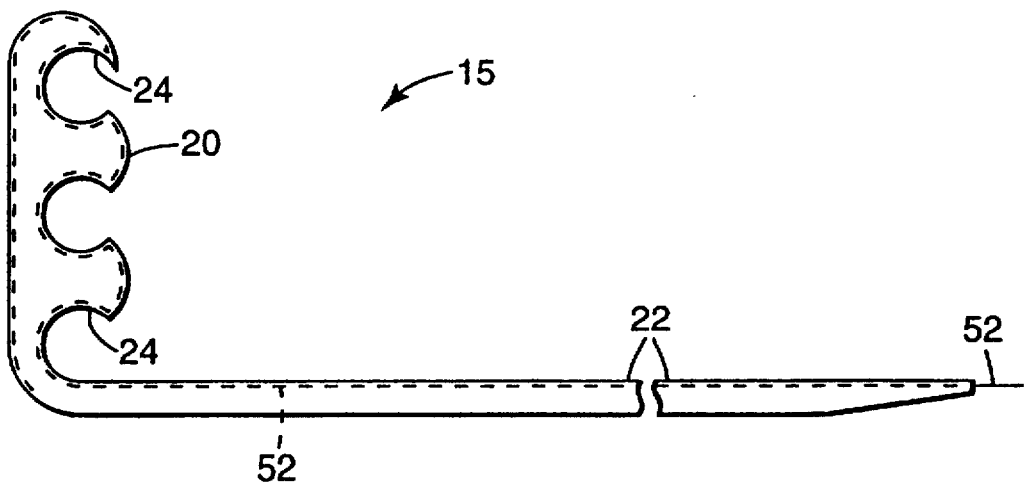
FIG. 10 is an end view illustrating still another embodiment of the end seal according to the present invention.

FIG. 10 illustrates an end seal 15 with a core portion 20 which is oblong as opposed to generally circular. The core portion 20 is of a shape which has generally convex surfaces such that the tail portion 22 can be tightly wrapped about the exterior surface to form a moisture seal for the closure. The core portion 20 is formed with a plurality of cable receiving openings 24. In FIG. 11, the end seal 15 is shown with a pair of cables 28, with one or more conductors, placed in two of the openings 24 and a plug 40 is illustrated in the third opening to show that the end seals of the present invention are versatile and if a cable is not required the seal will still function. Plug 40, being a solid cylindrical member, can be placed in the additional opening 24 with the tail portion wrapped therearound. The opening 24 can be formed with grooves in its inner surface, which extend about its axis, and the plug 40 can be formed with ribs circling the outer cylindrical surface, which mate with the grooves, such that the plug is not easily driven out of the opening 24.

Material selection for the end seal of the present invention requires good bonding capabilities to provide proper sealing as well as providing resistance to contamination, moisture and pressure. Bonding of joints to be sealed involves bonding of the selected material to itself, to cable jackets and to sealants which may be used. Since sealing is accomplished by heating, the selected material must also be suitably responsive to fusion bonding. As such, polyolefin elastomers are suitable and of that group, the flexible ethylene alphaolefin copolymer sold under the name ENGAGE by the Dow Chemical Company of Midland, Mich., is preferred.

Material selection for the sealant of the present invention requires an affinity to produce satisfactory fusion bonding. Thus, where a sealant is used in the present invention there are several alternatives. First, however, it should be understood that a suitable bond may be in some instances accomplished by resistance heating of abutting surfaces by the placement of nichrome wire at or near the abutting surfaces. Electrical stimulation of the wire will heat surrounding material sufficiently to bond all heated abutting surfaces, and with pressure applied through the curing process, suitable welds can be produced.

The nichrome wire can be in the typical round wire form or a flat strip and can be coated, imbedded or laminated in a strip of suitable sealant material such as polyethylene. Electrical stimulation of the wire will heat the surrounding sealant material and the abutting surfaces to be sealed. All abutting surfaces can be sealed in this manner enhanced by the additional or surplus sealant material which will assist in providing suitable seals with pressure applied through the fusion process.

In addition to using a wire coated by, imbedded in or laminated in a strip of sealant material such as polyethylene, a susceptor containing material can be added to the sealant which absorbs radio frequency (RF) energy and transfers it into heat energy. In this case, the wire is preferably copper and functions as an antenna. The heat produced causes the susceptor containing material including a polyethylene binder and the abutting surfaces to be sealed. Here again, sealing is enhanced by the additional or surplus material which will assist in providing suitable seals with pressure applied through the fusion process.

While it is not necessary to discuss every possible iteration of combining sealant material, susceptor material and wire types, it is clear that sealing is enhanced in view of the foregoing.

Figure 12:
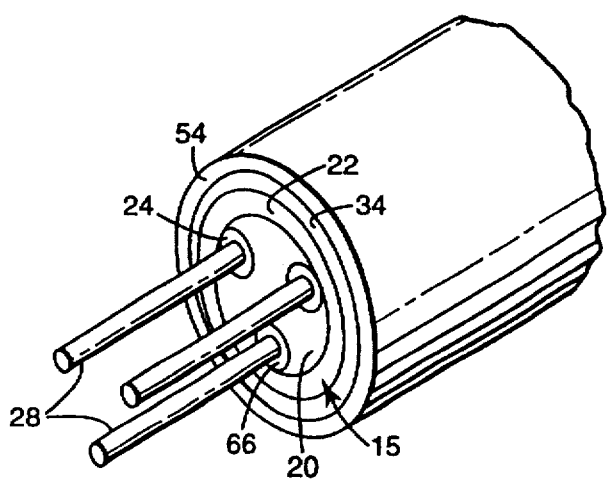
FIG. 12 is a perspective view illustrating the end seal of FIG. 5 mounted within a splice closure housing.
Figure 13:
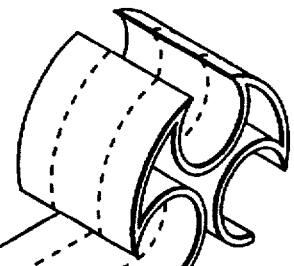
FIG. 13 is a perspective view illustrating an embodiment of a sealant strip according to the present invention.
Figure 14:
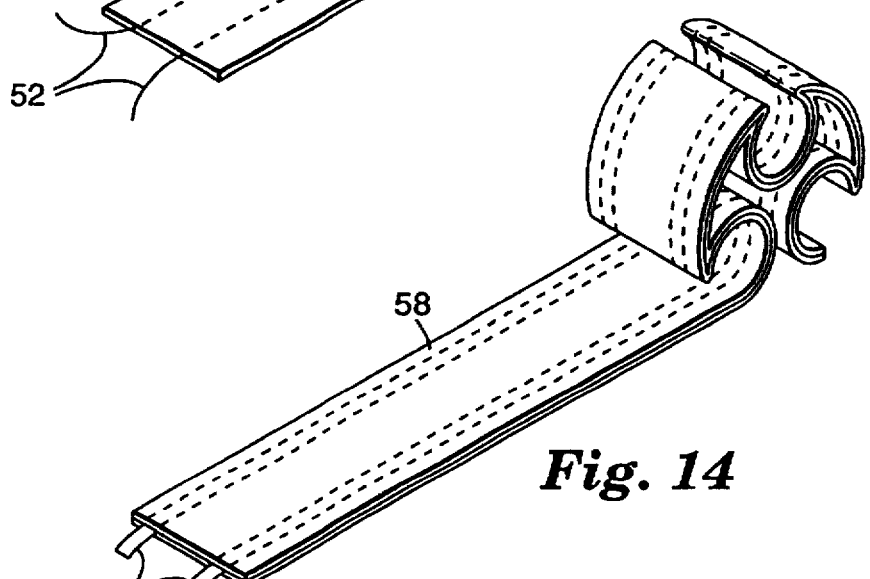
FIG. 14 is a perspective view illustrating another embodiment of a sealant strip according to the present invention.

According to the present invention, a fusion bonded seal is provided along the abutment 50, FIG. 5, between outer peripheral surface 30 of the core 20 and inner surface 32 of tail 22. The fusion bonded seal is also provided along annular wall 25, e.g., FIG. 2, of each cylindrical opening 24. The seal is accomplished by providing a resistance wire illustrated by dotted line 52, FIGS. 2 and 10, applied to or embedded in the appropriate surfaces as discussed above. The resistance wire 52 forms a closed circuit in which alternating current (AC) or direct current (DC) is applied for power. In addition, the resistance wire 52 can also be applied to outer surface 34, FIG. 1, of tail 22. In this manner, when tail 22 is wrapped about core 20, outer peripheral tail surface 34 can be bonded to an abutting splice closure housing 54, FIG. 12, into which end seal 15 is provided to be placed. Also, cables 28 are bonded in openings 24. The resistance wire 52 can be of a rounded cross-section or can be in the form of a braided wire or flat ribbon, FIGS. 13 and 14. Wire 52 can be molded into a sealant strip 56 of polyethylene material or placed between strips of laminated polyethylene sheets to form a laminated sealant strip 58. Thus, the strips 56 or 58 may be placed along the appropriate surfaces as aforesaid.

Figure 15:
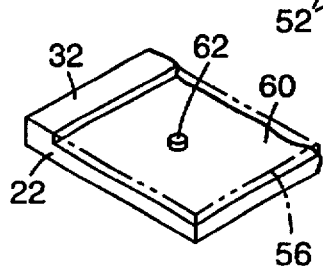
FIG. 15 is a partial perspective view illustrating an embodiment of a grooved tail according to the present invention.
Figure 16:
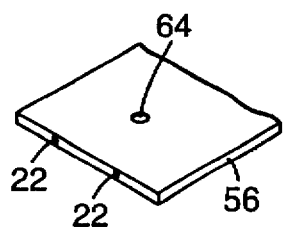
FIG. 16 is a partial perspective view illustrating an embodiment of a sealant strip according to the present invention.
Figure 17:
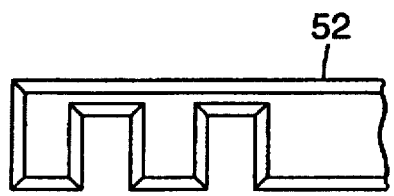
FIGS. 17–21 are partial plan views illustrating embodiments of wire configurations according to the present invention.
Figure 18:
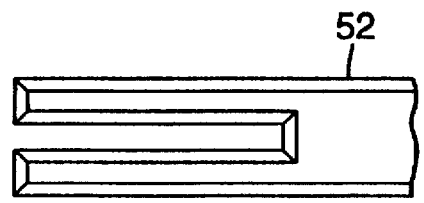
Figure 19:
Figure 20:
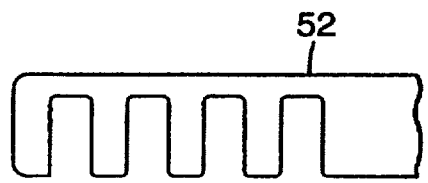
Figure 21:
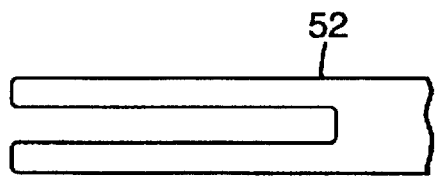

A groove 60, FIG. 15, may be provided in inner surface 32 of tail 22 including a protruding tab 62. Either of strips 56 and 58 can be positioned in groove 60 and retained therein by providing an opening 64, FIG. 16, in the strip for retention engagement with the tab 62. Various configurations and patterns, FIGS. 17–21, of resistance wire 52 may be applied to core 15. It has been noted that it is advantageous to consider such patterns to increase the density of resistance wire in cylindrical openings 24 to insure proper heating around the outer annular surfaces 66 of cables 28, FIGS. 11 and 12, and proper sealing of the cables 28 in openings 24.

In operation, cables are placed in the appropriate openings of the end seal and the tail portion is wrapped around the core portion. Resistance wires extending along the abutting surfaces between the tail and core and extending between the annular walls of the openings and the surfaces of cables therein, provide sufficient heat, when power is applied, to cause the surrounding seal material to bond to all contact surfaces. Similarly, when the end seal is to be placed in a splice closure body, wires around the outer periphery of the wrapped tail can provide the bonding required to seal the end seal within the closure body. To enhance sealing, additional sealant material may be provided in the form of a sealant strip having the wires buried therein. In this manner, added sealant enhances the fusion bonding process and seal integrity.

As it can be seen, the principal advantage of the present invention is that it provides a one-piece device, when joined around cables extending through the ports, which forms seals between the cable peripheral surfaces and the ports and also forms seals between the movable body portions of the end seal when those portions are joined together.

The fusion bonded end seal has advantages over previous approaches to end seal integrity. According to the present invention, the end seal is flexible to accommodate a multiple range of cable diameters. Fusion bond strength between cables and seal is higher than with a conventional hot melt system. The end seal is a one piece design which requires no trimming for multiple cable diameters. The end seal material can be re-entered and removed from the cables by cutting the material. The end seal of the present invention does not require the use of a torch for heating.

Utility of the invention allows the end seal to be a main sealing member for cable closure bodies in that it seals to the cable surfaces and also is sealed to the adjoining cable closure body. This forms an air tight, pressure and moisture seal to external elements. Basic features of the end seal provide built in strain relief, acceptance of different cable diameters, and total seal integrity between the relatively movable end seal body portions, the cables extending therethrough, and the closure body it is mounted in. Furthermore, the use of a continuous sealant strip to seal the cables in the ports and to seal the engaged surfaces of the body portions when they are engaged together, provides for facilitated installation.

Although illustrative embodiments of the invention have been shown and described, a wide range of modifications, changes and substitutions are contemplated in the foregoing disclosure and in some instances, some features of the present invention may be employed without a corresponding use of other features. Accordingly, it is appropriate that the appended claims be construed broadly and in a manner consistent with the scope of the invention.

What is claimed is:

1. A cable end seal comprising:

a body including a core portion connected to an extended tail portion;

the core portion having an outer peripheral surface and spaced ends, the peripheral surface including a plurality of cylindrical openings through said core portion extending between the ends, an edge of each opening communicating with the outer peripheral surface of the core portion to define an entrance slot to each opening;

the tail portion being flexible and having opposed ends, a first one of the opposed ends of the tail portion being integral with and extending tangentially from the outer peripheral surface of the core portion and having sufficient length to wrap about the peripheral surface of the core portion in abutment therewith to cover the entrance slot of each opening and a cable placed therein, a second free end of the tail portion being tapered to a reduced thickness; and conductive means disposed adjacent the abutment between the tail and core portions and along an annular surface of each cylindrical opening, said conductive means being responsive to electrical stimulation for heating adjacent material of the body and each said cable for fusion bonding of the tail portion to the core portion and each said cable to its respective opening, so that each said cable, the core portion, and the tail portion are fusion bonded into a sealed unit.

2. The end seal as defined in claim 1 wherein each cylindrical opening has a diameter different from each other cylindrical opening.

3. The end seal as defined in claim 1 wherein the tail portion is provided with oblique slits in spaced relationship along a length thereof for selectively severing the tail portion at a slit to shorten the length of the tail portion.

4. The end seal as defined in claim 1 wherein the core portion is generally circular in cross section.

5. The end seal as defined in claim 1 wherein the core portion is generally oblong in cross section.

6. The end seal as defined in claim 1 wherein the tail portion is formed with a rib on one surface and a groove on an opposed surface.

7. The end seal as defined in claim 1 further comprising the tail portion being wrapped about the core portion and an outer peripheral surface of the tail portion including further means extended thereabout responsive to electrical stimulation for heating the outer peripheral tail surface so that the outer peripheral tail surface can be fusion bonded to an abutting splice closure housing into which the end seal is placed.

8. A cable end seal comprising:

a body including a core portion connected to an extended tail portion;

the core portion having an outer peripheral surface and spaced ends, the peripheral surface including a plurality of cylindrical openings through said core portion extending between the ends, an edge of each opening communicating with the outer peripheral surface of the core portion to define an entrance slot to each opening;

a cable extending through at least one of the openings;

the tail portion being flexible and having opposed ends, a first one of the opposed ends of the tail portion being integral with and extending tangentially from the outer peripheral surface of the core portion and having sufficient length to wrap about the peripheral surface of the core portion in abutment therewith to cover the entrance slot of each opening and the cable therein, a second free end of the tail portion being tapered to a reduced thickness; and conductive means imbedded in the body adjacent the abutment between the tail and core portions and along an annular surface of each cylindrical opening, said conductive means being responsive to electrical stimulation for heating adjacent material of the body and the cable for fusion bonding of the tail portion to the core portion, and the cable to its respective opening so that the cable, the core portion, and the tail portion are fusion bonded into a sealed unit.

9. A cable end seal comprising:

a body including a core portion connected to an extended tail portion;

the core portion having an outer peripheral surface and spaced ends, the peripheral surface including a plurality of cylindrical openings through said core portion extending between the ends, an edge of each opening communicating with the outer peripheral surface of the core portion to define an entrance slot to each opening;

a cable extending through at least one of the openings;

a sealing plug in at least one of the openings;

the tail portion being flexible and having opposed ends, a first one of the opposed ends of the tail portion being integral with and extending tangentially from the outer peripheral surface of the core portion and having sufficient length to wrap about the peripheral surface of the core portion in abutment therewith to cover the entrance slot of each opening and the cable therein, a second free end of the tail portion being tapered to a reduced thickness;

conductive means disposed adjacent the abutment between the tail and core portions and along an annular surface of each cylindrical opening, said conductive means being responsive to electrical stimulation for heating adjacent material of the body and the cable for fusion bonding of the tail portion to the core portion, and the cable and plug to their respective openings so that the cable, the plug, the core portion, and the tail portion are fusion bonded into a sealed unit.

10. A cable end seal comprising:

a body including a core portion connected to an extended tail portion;

the core portion having an outer peripheral surface and spaced ends, the peripheral surface including a plurality of cylindrical openings through said core portion extending between the ends, an edge of each opening communicating with the outer peripheral surface of the core portion to define an entrance slot to each opening;

the tail portion being flexible and having opposed ends, a first one of the opposed ends of the tail portion being integral with and extending tangentially from the outer peripheral surface of the core portion and having sufficient length to wrap about the peripheral surface of the core portion in abutment therewith to cover the entrance slot of each opening and a cable placed therein, a second free end of the tail portion being tapered to a reduced thickness, the tail portion formed with a groove on one surface thereof;

a sealant strip positioned in the groove and extending along the abutment between the tail and core portions and along an annular surface of each cylindrical opening, the groove including a protruding tab and the sealant strip having an opening therein for receiving the tab so as to retain the strip in the groove; and means in the strip responsive to electrical stimulation for heating the sealant strip for bonding of the body and each said cable into a sealed unit.

11. The end seal as defined in claim 10 wherein each cylindrical opening has a diameter different from each other cylindrical opening.

12. The end seal as defined in claim 10 wherein the tail portion is provided with oblique slits in spaced relationship along a length thereof for selectively severing the tail portion at a slit to shorten the length of the tail portion.

13. The end seal as defined in claim 10 wherein the core portion is generally circular in cross section.

14. The end seal as defined in claim 10 wherein the core portion is generally oblong in cross section.

15. The end seal as defined in claim 10 wherein the tail portion is formed with a rib on one surface and the groove on an opposed surface.

16. The end seal as defined in claim 10 wherein the means responsive to electrical stimulation is a conductive wire.

17. The end seal as defined in claim 10 wherein the means responsive to electrical stimulation is a conductive strip.

18. The end seal as defined in claim 10 further comprising the tail portion being wrapped about the core portion and an outer peripheral surface of the tail portion including a further sealant strip having means responsive to electrical stimulation therein for heating the strip so that the outer peripheral tail surface can be fusion bonded to an abutting splice closure housing into which the end seal is placed.

* * * * *